(12) United States Patent
Hidaka et al.

(10) Patent No.: US 7,730,982 B2
(45) Date of Patent: Jun. 8, 2010

(54) OIL PUMP DRIVING CONTROL DEVICE FOR A HYBRID VEHICLE

(75) Inventors: Terumasa Hidaka, Atsugi (JP); Taiichi Onoyama, Yokohama (JP); Koichi Hayasaki, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1038 days.

(21) Appl. No.: 11/446,721

(22) Filed: Jun. 5, 2006

(65) Prior Publication Data

US 2006/0272869 A1 Dec. 7, 2006

(30) Foreign Application Priority Data

Jun. 6, 2005 (JP) ............................. 2005-166261
Feb. 24, 2006 (JP) ............................. 2006-047628

(51) Int. Cl.
*B60W 20/00* (2006.01)
*B60W 10/02* (2006.01)
*B60W 10/06* (2006.01)
*B60W 10/08* (2006.01)

(52) U.S. Cl. ............................. 180/65.265; 180/65.275; 180/65.25; 180/292

(58) Field of Classification Search .............. 180/65.21, 180/65.22, 65.225, 65.23, 65.245, 65.25, 180/65.265, 65.275, 292, 293

See application file for complete search history.

(56) References Cited

U.S. PATENT DOCUMENTS

| 5,168,975 | A | 12/1992 | Bernhardt et al. |
| 6,341,584 | B1* | 1/2002 | Itoyama et al. ............ 123/90.15 |
| 6,428,444 | B1* | 8/2002 | Tabata .............................. 477/3 |
| 6,863,140 | B2* | 3/2005 | Noreikat et al. .......... 180/65.23 |
| 2002/0107103 | A1* | 8/2002 | Nakamori et al. ............ 475/116 |
| 2003/0029653 | A1* | 2/2003 | Fujikawa ................... 180/65.2 |
| 2003/0127262 | A1* | 7/2003 | Noreikat et al. ............ 180/65.2 |
| 2005/0003928 | A1* | 1/2005 | Niki et al. ........................ 477/5 |
| 2005/0103544 | A1* | 5/2005 | Takami et al. .............. 180/65.2 |
| 2008/0135314 | A1* | 6/2008 | Motoike et al. ............ 180/65.2 |

FOREIGN PATENT DOCUMENTS

DE   196 25 022 A1   1/1997
JP   7-167261   7/1995

(Continued)

*Primary Examiner*—Paul N Dickson
*Assistant Examiner*—John R Olszewski
(74) *Attorney, Agent, or Firm*—Young Basile

(57) ABSTRACT

In general, an oil pump driving control device for a hybrid vehicle is described. A hybrid vehicle includes a drive-train configured and arranged to transmit power in the order of an engine, a first clutch, a motor generator, a second clutch and a drive wheel, and an oil pump operably configured and arranged at a location between the first clutch and the second clutch such that the oil pump is mechanically driven by at least one of the engine and the motor generator. The invention provides an oil pump driving control device that supplies the necessary oil pressure for an automatic transmission with only a single mechanical oil pump. For example, even when it is not possible to maintain tightening of the second clutch, oil pressure may be supplied by rotating the oil pump using the motor generator. In this way, the oil pressure may be supplied with a single oil pump.

18 Claims, 10 Drawing Sheets

FOREIGN PATENT DOCUMENTS

| | | |
|---|---|---|
| JP | 08-79915 | 3/1996 |
| JP | 11-082261 | 3/1999 |
| JP | 2000-296720 | 10/2000 |
| JP | 2001-280458 | 10/2001 |
| JP | 2002-166736 A | 6/2002 |
| JP | 2002-542752 A | 12/2002 |
| JP | 2003-231420 A | 8/2003 |

* cited by examiner

OIL PUMP DRIVING CONTROL DEVICE FOR A HYBRID VEHICLE

This application claims priority from Japanese Patent Application No. 2005-166261, filed Jun. 6, 2005, and Japanese Patent Application No. 2006-047628, filed Feb. 24, 2006, the entire contents of each of which is incorporated herein by reference.

TECHNICAL FIELD

The invention relates to an oil pump driving control device for a hybrid vehicle.

BACKGROUND

In a hybrid vehicle having an automatic transmission (hereinafter called "AT") combined with an electric-powered motor, when the hybrid vehicle is stopped and idling, an oil pump supplying an oil pressure to the AT stops pumping. As a result, the oil pressure needed for controlling the AT cannot be generated. To address this issue, the hybrid vehicle is equipped with a supplemental oil pump and supplemental electric-powered motor that drives the supplemental oil pump. Accordingly, the oil pressure which controls the AT can be generated not only when the car is running, but also when the car is idling. The addition of the supplemental oil pump and supplemental electric-powered motor may increase the overall cost and weight of the hybrid vehicle.

SUMMARY

In general, the invention relates to an oil pump driving control device for a hybrid vehicle. A hybrid vehicle having automatic transmission (AT) has a supplemental pump and supplemental electric-powered motor in addition to an existing pump inside the AT. Oil pressure circuits are needed to control both the existing pump and the supplemental pump. Moreover, it is desirable to create a smooth transition between the oil pressure circuits when switching between the existing pump and the supplemental pump.

The invention provides an oil pump driving control device for a hybrid vehicle that supplies the necessary oil pressure at all times with only a single mechanical oil pump. The hybrid vehicle has a hybrid driving system in which components connected in sequence include an engine, a first clutch, a motor generator, a second clutch, and driving wheels. The components are physically arranged in this overall order, but may have intermediate components between one or more of the above components. An oil pump is placed between the first clutch and the second clutch. An oil pump driving control means drives the oil pump by the engine or the motor generator. For example, even when it is not possible to maintain the tightening of the second clutch, it is possible to supply the oil pressure by rotating the oil pump using the motor generator. In this way, it is possible to supply the oil pressure at any time with a single oil pump.

The present invention may provide one or more advantages. For example, the invention may result in a simplification of the hydraulic circuit since only a single oil pump is needed. This may result in a reduction in the number of parts (including a reduction in a special electric power source if there is a strong electric driving pump), a lighter weight, and a reduction in cost. As another example, from the creep force which is maintained by creep control of the second clutch, it is possible to have creep running without the unpleasant feelings that may exist with conventional vehicles. As a further example, it is possible to quickly start the engine by using the inertia of the motor generator MG when the vehicle begins to rapidly accelerate. In this way, by using the motor's inertia for a rapid acceleration from a state of complete stoppage, it may be possible to maintain a departure interval that is close the conventional vehicles or suitably short.

In one embodiment, a hybrid vehicle includes a drive-train configured and arranged to transmit power in the order of an engine, a first clutch, a motor generator, a second clutch and a drive wheel, and an oil pump operably configured and arranged at a location between the first clutch and the second clutch such that the oil pump is mechanically driven by at least one of the engine and the motor generator.

In another embodiment, a hybrid vehicle includes a drive-train configured and arranged to transmit power in the order of an engine, a first clutch, a motor generator, a second clutch and a drive wheel. The hybrid vehicle further includes an oil pump operably configured and arranged at a location between the first clutch and the second clutch such that the oil pump is mechanically driven by at least one of the engine and the motor generator, and a controller configured and arranged to control the oil pump to obtain a desired oil pressure from the oil pump by controlling at least one of the engine and the motor generator in response to a vehicle operation condition of the hybrid vehicle. The motor generator drives the oil pump at a speed that is substantially equal to an engine idling speed with controlling the second clutch at a reduced torque capacity when the engine is in an engine idle stop condition and the hybrid vehicle is in a non-acceleration condition, and the motor generator drives the oil pump at a predetermined speed corresponding to a depression of an acceleration pedal with controlling the second clutch at an increased torque capacity when the acceleration pedal is depressed.

In a further embodiment, a method for maintaining oil pressure for controlling an automatic transmission of a hybrid vehicle, the hybrid vehicle including a drive-train configured and arranged to transmit power in the order of an engine, a first clutch, a motor generator, a second clutch and drive wheels, comprises detecting a vehicle operation condition of the hybrid vehicle including an engine idle stop condition. The method further includes driving an oil pump by the motor generator when the vehicle operation condition is in the engine idle stop condition such that a desired oil pressure is obtained from the oil pump that is arranged between the first clutch and the second clutch.

In yet another embodiment, a hybrid vehicle having a drive-train configured and arranged to transmit power in the order of an engine, a first clutch, a motor generator, a second clutch and drive wheel, the hybrid vehicle comprises detecting means for detecting a vehicle operation condition of the hybrid vehicle including an engine idle stop condition. The hybrid vehicle further includes oil pump control means for driving an oil pump by the motor generator when the vehicle operation condition is in the engine idle stop condition such that a desired oil pressure is obtained from the oil pump that is arranged between the first clutch and the second clutch.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
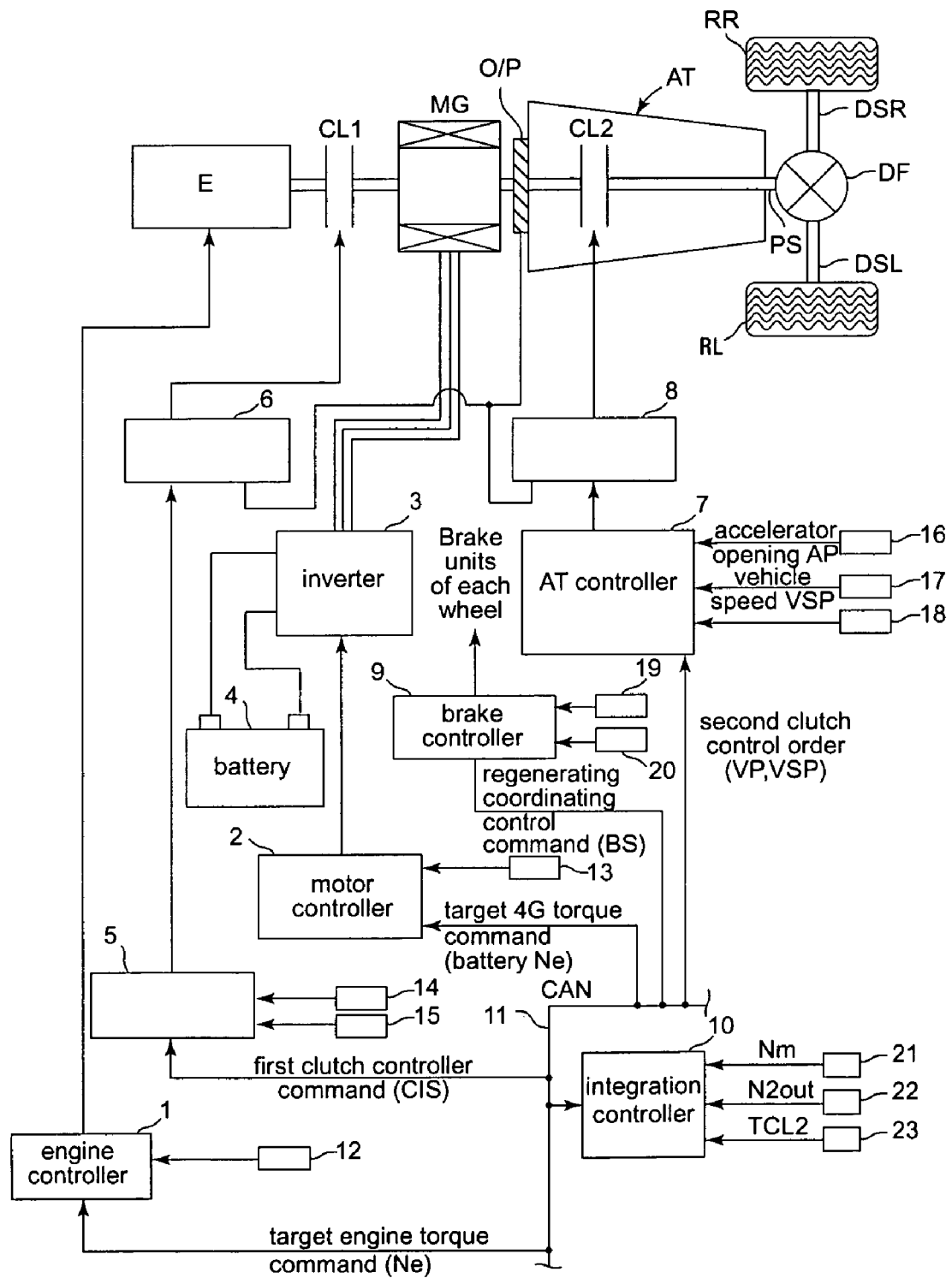
FIG. 1 is a system diagram which shows an example hybrid vehicle with rear wheel drive consistent with the principles of the invention.

The preferred embodiments of the oil pump driving control device for a hybrid vehicle of the present invention will be described based on embodiments shown in the FIGS. FIG. 1 is a system diagram which shows an example hybrid vehicle with rear wheel drive in which the oil pump driving control device of Embodiment 1 may be used. The structure of the drive-train of the example hybrid vehicle will now be described. As shown in FIG. 1, the drive-train of the hybrid vehicle of Embodiment 1 is comprised of engine E, motor generator MG, first clutch CL1, second clutch CL2, automatic transmission AT, propeller shaft PS, differential DF, left drive shaft DSL, right drive shaft DSR, rear left wheel (driving wheel) RL, rear right wheel (driving wheel) RR, and mechanical oil pump O/P.

Engine E may be a gasoline engine or diesel engine where the valve opening of the throttle valve and the like is controlled based on the control command from engine controller 1, which is described below. Motor generator MG is a synchronous motor generator wherein a permanent magnet is laid into the rotor and a stator is wrapped with a stator coil, and is controlled by application of a three-phase alternating current which is generated in inverter 3 based on the control command from motor controller 2, which is described below. Motor generator MG can be operated as an electric-powered machine which is rotatably driven by receiving the power supply from battery 4 (hereinafter this operating state is called "power running"). Also, when the rotor is rotated by an external force, motor generator MG can function as the power generator which generates an electromotive force in both ends of the stator coil and charge battery 4 (hereinafter this operating state is called "regeneration"). Here, the rotor of motor generator MG is connected to the input axis of automatic transmission AT through a damper (not shown).

First clutch CL1 may be an oil pressure-type single disc clutch or oil pressure-type multiple disc clutch which is placed between engine E and motor generator MG. The engagement and release of the clutch (which include the slipping engagement and slipping release) are controlled by the controlled oil pressure. The controlled oil pressure is made by oil pressure unit 6 of the first clutch based on the control command from first clutch controller 5, which is described below.

Second clutch CL2 is an oil pressure-type multiple disc clutch which is placed between the motor generator MG and the left and right rear wheels RL and RR. The engagement and release of the clutch (which include the slipping engagement and slipping release) are controlled by the controlled oil pressure. The controlled oil pressure is made by oil pressure unit 8 of the second clutch based on the control command from AT controller 7, which is described below.

Automatic transmission AT is a transmission that automatically switches the transmission gear ratio of levels, such as 5 speeds for forward travel, 1 speed for backward travel or 6 speeds for forward travel, 1 speed for backward travel, based on speed of the vehicle and the acceleration opening. Second clutch CL2 is not newly added to the vehicle as a special clutch. Instead, among a plurality of friction engagement factors that are created as the transmission factors of automatic transmission AT, second clutch CL2 uses the friction engagement factor that exists in the driving force transmitting paths of each transmission gear ratio of levels. The output axis of automatic transmission AT is connected to the left and right rear wheels RL and RR through propeller shaft PS, differential DF, left drive shaft DSL and right drive shaft DSR.

Mechanical oil pump O/P is placed between motor generator MG and second clutch CL2 and there is adopted a structure that may have an inscribed gear form pump, a circumscribed gear form pump, or a vane pump, which generates an output pressure as at least one pump power source. This mechanical oil pump O/P receives rotations of the motor generator's axis, that is, rotations of the transmission input shaft, and can generate hydraulic pressure. It is possible to mechanically drive the mechanical oil pump O/P using the engine E by tightening the first clutch and it is possible to mechanically drive the mechanical oil pump O/P using the motor generator MG by releasing the first clutch. The mechanical oil pump O/P is already one hydraulic pressure source for the hybrid vehicle's drive-train, and the discharge oil from the mechanical oil pump O/P is supplied to the first clutch hydraulic pressure unit 6 and the second clutch hydraulic pressure unit 8.

Next, an exemplary control system of a hybrid vehicle will be described. As shown in FIG. 1, the control system of a hybrid vehicle of Embodiment 1 is comprised of engine controller 1, motor controller 2, inverter 3, battery 4, first clutch controller 5, first clutch oil pressure unit 6, AT controller 7, second clutch oil pressure unit 8, brake controller 9 and integration controller 10. Here, engine controller 1, motor controller 9 and integration controller 10 are connected through CAN communication line 11 with which they can exchange information.

Engine controller 1 inputs information on the number of engine rotations from engine rotation number sensor 12 and receives a command on the target engine torque and the like from integration controller 10. Engine controller 1 outputs the command that controls engine operation points (Ne and Te) to, for example, a throttle valve actuator. Here, the information on engine rotation number Ne is supplied to integration controller 10 through CAN communication line 11.

Motor controller 2 inputs information from resolver 13, which detects the rotor rotation position of motor generator MG, and receives a command on the target motor generator torque and the like. Motor controller 2 outputs the command which controls motor operation points (Nm and Tm) of motor generator MG to inverter 3. Here, motor controller 2 monitors battery SOC which shows the charging capacity state of battery 4. The information on battery SOC is used for the information on the control of motor generator MG and supplied to integration controller 10 through CAN communication line 11.

An oil pressure sensor may detect an oil pressure supplied from the oil pump. At least one of the engine and the motor generator may be requested to drive the oil pump when the oil pressure becomes lower than a predetermined pressure. First clutch controller 5 inputs sensor information from first clutch oil pressure sensor 14 and first clutch stroke sensor 15, receives a command to control the first clutch from integration controller 10 and outputs the command to control engagement and release of first clutch CL1 to first clutch oil pressure unit 6. Here, the information on first clutch stroke C1S is supplied to integration controller 10 through CAN communication line 11.

AT controller 7 inputs sensor information from acceleration opening sensor 16, vehicle speed sensor 17, second clutch oil pressure sensor 18 and inhibitor switch 24 and the like. AT controller 7 receives a command to control the second clutch from integration controller 10 and outputs the command to control engagement and release of second clutch CL2 to second clutch oil pressure unit 8 located inside the AT oil pressure control valve as a priority over the transmission control of the second clutch. Here, the information on accelerator opening AP and vehicle speed VSP are supplied to integration controller 10 through CAN communication line 11.

Brake controller 9 inputs sensor information from wheel speed sensor 19 which detects each wheel speed of the four wheels and brake stroke sensor 20 and the like. For example, when the brake is applied and the regenerative braking force is not sufficient to meet the braking force demanded by brake stroke BS, brake controller 9 does regenerative coordinating braking based on the command to do the regenerative coordinating braking from integration controller 10. In this manner, the insufficient braking force can be supplemented by a mechanical braking force (e.g., liquid pressure braking force and motor braking force).

Integration controller 10 manages the energy consumed in the whole vehicle and has a function of running the vehicle at its maximum efficiency. Integration controller 10 inputs information from motor rotation number sensor 21 which detects motor rotation number Nm, second clutch output rotation number sensor 22 which detects second clutch output rotation number N2out, and second clutch torque sensor 23 which detects second clutch torque TCL2, and the above described information obtained through CAN communication line 11. Then, integration controller 10 controls operation of engine E based on the command to control engine controller 1, controls operation of motor generator MG based on the command to control motor controller 2, controls engagement and release of first clutch CL1 based on the command to control first clutch controller 5, and controls release of second clutch CL2 based on the command to control AT controller 7.

Here, among the information on input and output rotation number of first clutch CL1 and second clutch CL2, the information on the input rotation number of first clutch CL1 is obtained from engine rotation number sensor 12 which detects engine rotation number Ne and the information on the output rotation number of first clutch CL1 is obtained from motor rotation number sensor 21. Motor rotation number sensor 21 detects motor rotation number Nm while the information on the input rotation number of second clutch CL2 is obtained from motor rotation number sensor 21. The information on the output rotation number of second clutch CL2 is obtained from second clutch output rotation number sensor 22 which detects the output rotation number N2out of the second clutch.

Next, an exemplary running mode of the hybrid vehicle of Embodiment 1 will be described. The hybrid driving system of Embodiment 1 has first clutch CL1 between engine E and motor generator MG and has second clutch CL2 between the motor generator MG and left and right rear wheels RL and RR. The hybrid driving system has four running modes which are "engine running mode", "motor running mode", "motor-assisted running mode" and "running power generation mode".

The "engine running mode" engages first clutch CL1 which is located between engine E and motor generator MG and drives left and right rear wheels RL and RR which are the driving wheels where only engine E is used as the driving source. The "motor running mode" releases first clutch CL1 which is located between engine E and motor generator MG and left and right rear wheels RL and RR which are the driving wheels where only motor generator MG is used as the driving source. The "motor-assisted running mode" engages first clutch CL1 which is located between engine E and motor generator MG and drives left and right rear wheels RL and RR which are the driving wheels where engine E and motor generator MG are used as the driving sources.

The "running power generation mode" engages first clutch CL1 which is located between engine E and motor generator MG and drives left and right rear wheels RL and RR which are the driving wheels where engine E is used as the driving source. At the same time the "running power generation mode" drives motor generator MG as the power generator by using the driving force of engine E. Here, when the "motor running mode" is changed to the "engine running mode" and engine E which stops in the "motor running mode" is started, second clutch CL2 is used so that the engine starting shock is not transmitted to the driving wheels, left and right rear wheels RL and RR, by the slipping engagement.

Figure 2:
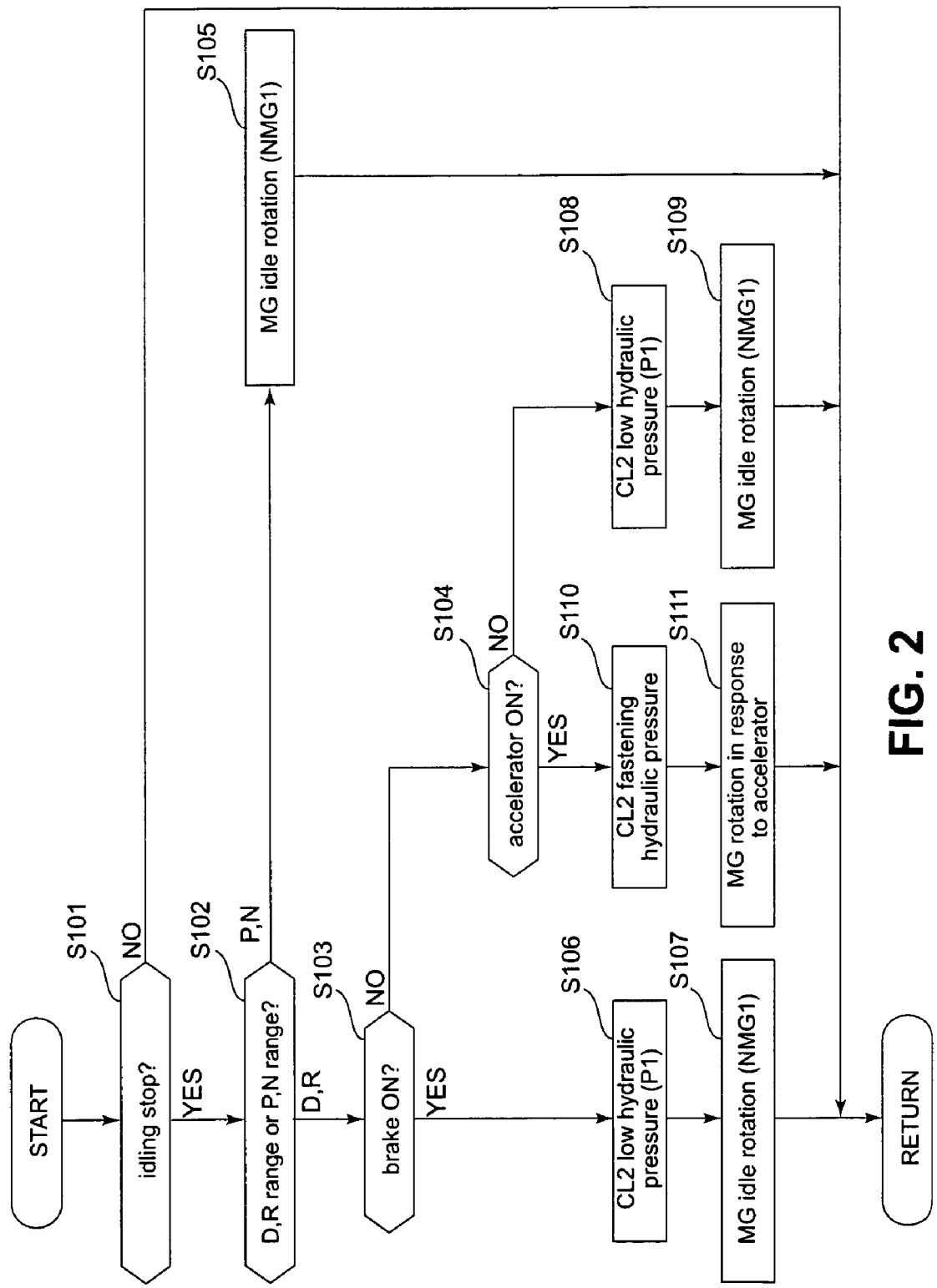
FIG. 2 is a flowchart which shows the flow of an example oil pump driving control processing which is implemented by an integration controller of Embodiment 1.

FIG. 2 is a flowchart which shows the flow of an example oil pump driving control processing which is implemented by an integration controller of Embodiment 1. The integration controller 1 controls the mechanical oil pump O/P by controlling at least one of the engine E and the motor generator MG in response to a vehicle operation condition of the hybrid vehicle. In the step S101, the engine E is stopped, and integration controller 1 determines whether or not it is during an idling stop which releases the first clutch CL1 (i.e., an engine idle stop condition). If YES (during idling stop), proceed to step S102, and if NO (not during idling stop), return.

In step S102, a continuation from the judgment in step S101 that the state was in idling stop, integration controller 1 determines which range position has been selected by the select lever of the automatic transmission AT. Possibilities include the drive range (D range) which is the running range, the reverse range (R range), or the parking range (P range) which is the stop range, and the neutral range (N range). When in the running range (D range, R range), proceed to step S103, and if in the stop range (P range, N range), proceed to step S105.

In step S103, which is a continuation of the selection of the running range (D range, R range) of step S102, integration controller 1 determines whether or not the brake is engaged. If YES (brake engaged), proceed to S106, and if NO (brake is released), proceed to step S104. In step S104, which is a continuation from the judgment that the brake was released in step S103, integration controller 1 determines whether the accelerator is engaged or not, and if YES (accelerator engaged), proceed to step S108, and if NO (foot detached from accelerator), proceed to step S110.

In step S105, which is a continuation while in idling stop (step S101) and from the judgment of (step S102) during the selection of the P, N range, and assuming that the idle rotation number NMG1 is the rotation number of the motor's generator MG, return. In step S106, which is a continuation from when in idling stop (step S101), and having selected the D and R ranges (step S102), and with the determination that the brake is ON (step S103), assuming that the hydraulic pressure P1 which is used for slip control corresponds to the second clutch CL2, proceed to S107.

In step S107, which is a continuation of the slip tightening control of the second clutch CL2 in step S106, and assuming the idle rotation number NMG1 is the rotation number of the motor's generator MG, return. In step S108, which is a continuation from when in idling stop (step S101), and having selected the D and R ranges (step S102), and with the determination that the brake is OFF (step S103), and the accelerator is OFF (step S104), assuming that the hydraulic pressure P1 which is used for slip control corresponds to the second clutch CL2, proceed to S109.

In step S109, continuing from the slip tightening control of the second clutch in step S108, and assuming the idle rotation number NMG1 is the rotation number of the motor generator MG, return. In step S110, which is a continuation from when in idling stop (step S101), and having selected the D and R ranges (step S102), and with the determination that the brake is OFF (step S103), and accelerator is ON (step S104), and assuming that the tightening hydraulic pressure does not generate any slip in the second clutch CL2, proceed to step S111. In step S111, which is a continuation of the tightening control of the second clutch CL2 in step S110, and assuming the rotation number which corresponds to the degree of accelerator opening is the rotation number of the motor's engine, return.

Next, there is an explanation of the oil pump driving control operation. Embodiment 1 makes effective use of the motor generator MG which is housed together with the engine E in the hybrid vehicle, and adding to the existing function which has a motor generator (drive motor function-electric generation function-engine starter motor function), and having a pump motor function which drives the mechanical oil pump O/P, makes it possible to maintain hydraulic pressure which controls the automatic transmission AT which has a second clutch CL2 even during an idling stop.

Below, there is an explanation based on the flowchart shown in FIG. 2 of the oil pump driving control operation for Embodiment 1. First, during an idling stop and when the P, N range is selected, in the flowchart chart of FIG. 2, there is the progression step S101→step S102→step S105, and in step S105, the rotation number of the motor generator MG is assumed to be the idle rotation number NMG1.

While in an idling stop state, if the selections of P, N ranges are replaced by the selection of D, R ranges, if the brake is ON, in the flowchart of FIG. 2, there is the progression step S101→step S102→step S103→step S106→step S107, and in step S106, there is slip tightening control with the slip control hydraulic pressure P1 as the second clutch, and in step S107, the rotation number of the motor generator MG is assumed to be the idle rotation number NMG1. Furthermore, proceeding to brake OFF from brake ON, until it is assumed that the accelerator reaches the ON state, as in the flowchart of FIG. 2, there is the progression step S101→step S102→step S103→step S104→step S108→step S109, and in step S108, there is execution of the slip tightening control as is assuming that the hydraulic pressure P1 which is used for the slip control is supplied to the second clutch. With step S109, the rotation number of the motor's generator and the idle rotation number NMG1 are maintained.

During an idling stop, when D,R ranges have been selected, and when the brake is OFF, assuming the accelerator is ON, as in the flow chart of FIG. 2, there is the progression step S101→step S102→step S103→step S104→step S110→step S111→. In step S110, there is no slipping of the second clutch CL2, and tightening control is executed, and in step S111, the rotation number of the motor generator MG is assumed to be the rotation number that corresponds to the degree of opening of the accelerator.

Figure 3:
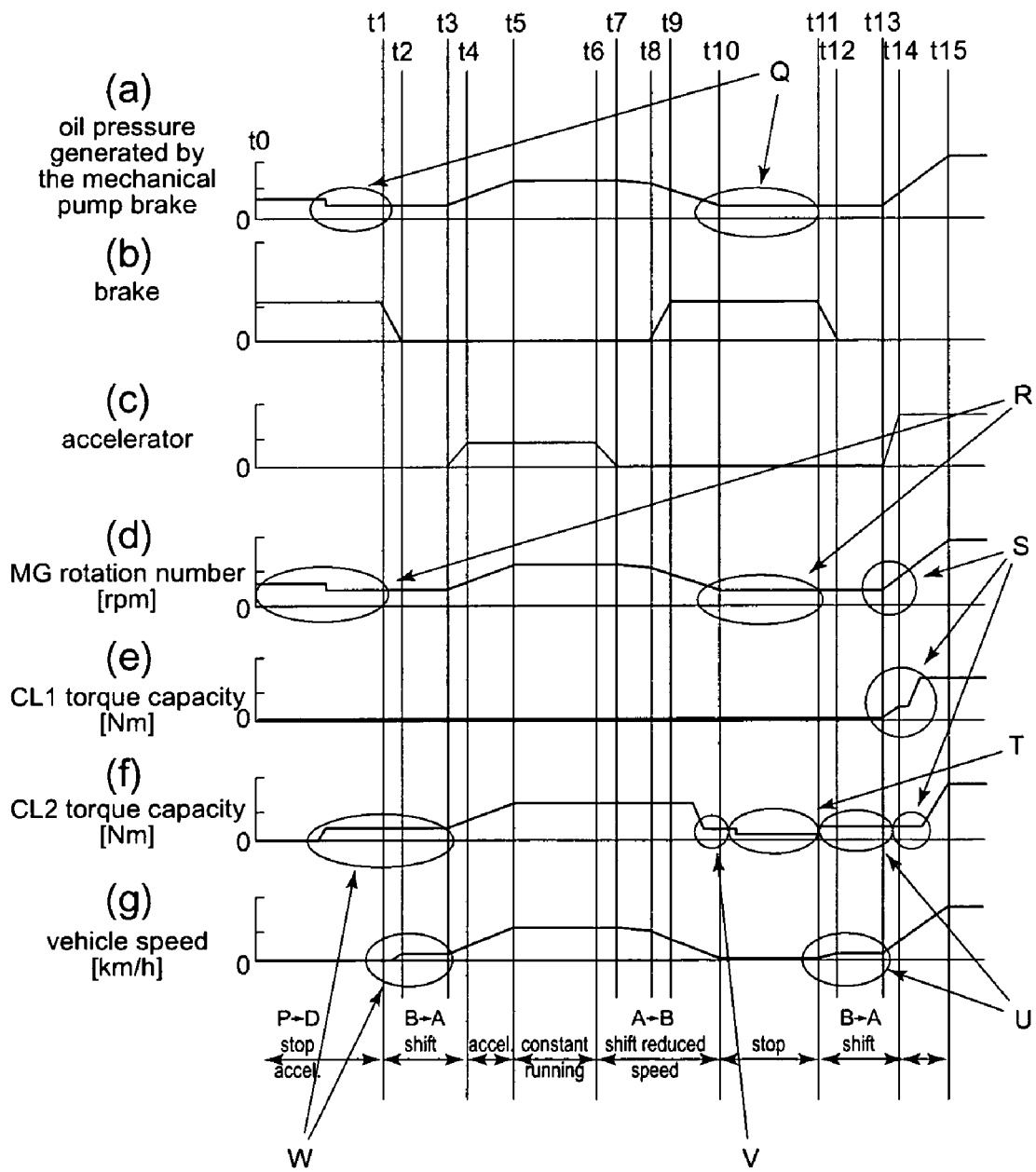
FIG. 3 is a timing chart which shows example properties of the mechanical oil pump in the device of Embodiment 1 during the case where the vehicle stops, starts and maintains a constant run.

FIG. 3 is a timing chart which shows example properties of the mechanical oil pump in the device of Embodiment 1 during the case where the vehicle stops, starts and maintains a constant run. There is displayed (a) the generated pressure of the mechanical oil pump O/P, (b) the pressing amount of the brake, (c) the pressing amount of the accelerator, (d) the rotation number of the motor generator MG, (e) the torque capacity of the first clutch CL1, (f) the torque capacity of the second clutch CL2, and (g) the speed of the vehicle. The oil pump driving control operation of Embodiment 1 is described based on the time chart indicating the oil pressure generating state in each running scene of FIG. 3.

First, sufficient warm-up is performed, from the time t0 where there is idling stop until the time t1, as shown in FIG. 3, and revolutions appropriate for idling are maintained for the motor generator also while the vehicle is stopped. From this, as shown in FIG. 3, it is possible to maintain the operating hydraulic pressure of the clutch-brake, which includes the second clutch within the automatic transmission AT.

Passing from the instant t0 to t1, for example, when there is shifting from the P range to the D range, assuming a holding capacity for creep by slip control, there is maintenance of the creep until the initial point when accelerator is pressed. Accordingly, as shown in W of FIG. 3, brake release is started at time t1, and if the release is completed by time t2, the vehicle is moving from just before t2, and the creep of the vehicle is maintained until the time t3 when the accelerator is initially pressed.

From t3 to t4, the amount that the accelerator is pressed increases, and the amount pressed is maintained from t4 to t6, and from t6, operation is begun with foot separation from the accelerator, and at t7, the accelerator is completely closed. At t8, brake operation is begun, and from t9 to t11, it is assumed that a constant amount of pressure is placed on the brake. By this accelerator operation and brake operation, from t3 to t5, the vehicle increases in speed, and from t5 to t7 there is maintained a constant running (vehicle running condition), and from t7 there is a reduction in speed, and from t8, a rapid reduction results, and at t10, the vehicle is stopped.

During the interval from t9 to t10, the vehicle's speed is reduced until just before the vehicle is stopped (at a level of creeping speed), and as shown in FIG. 3, once again, slip control which reduces the tightening amount of the second clutch is executed, and creep torque is maintained. In addition, for vehicle stoppage from t10 to t11, as shown in FIG. 3's Q and R, by maintaining the revolutions suitable for idling by the motor generator MG, there is maintenance of the operating hydraulic pressure of the clutch-brake which includes the second clutch within the automatic transmission AT.

Furthermore, from t10 at which there is stoppage by pressing on the brake while in the D,R range until t11, during this time, as shown in T of FIG. 3, the tightening amount of the second clutch is further reduced, and during the time from t11 to t12, as there is retightening which returns to the start of the tightening amount the second clutch by detecting the reduction in amount of the brake pressing, it is possible to prevent heat generation and abrasion. Brake release starts from t11, and if completely release by t12, as shown in U of FIG. 3, the vehicle moves from just before t12, and creep speed is maintained until t13 when accelerator pressing begins.

Next, at t13, there is rapid pressing of the accelerator based on rapid departure requirements, and assuming at t14 there is the maximum pressing of the accelerator, and by performing control which maintains at a high level a prescribed gradient from t13 to t14 the torque capacity of the first clutch CL1 as shown in FIG. 3 for rapid departure which accelerates the vehicle until t15, there is a quick start of the engine E by using the inertia of the motor's generator. As there is no transfer at this time of shock to the left and right rear wheels RL, RR, slip control of the second clutch is maintained.

Moreover, after the first clutch CL1's torque is maintained at a prescribed high gradient from t13 to t14, the torque is increased until the torque results in complete tightening, and the torque capacity of the second clutch becomes tightened from the slip control when the torque capacity of the first clutch CL1 reaches a level of complete torque tightening. In this way, under a variety of vehicle conditions, there is maintenance of the pump motor function for one motor generator MG, and by generating a hydraulic pressure from the mechanical oil pump O/P, it is possible to operate the clutch-brake within the automatic transmission.

Next, there is an explanation of the effects. It is possible, from the oil pump driving control device of the hybrid vehicle of Embodiment 1 to obtain the effect mentioned below. (1) In a hybrid vehicle in which there is formed a hybrid driving system by connecting in sequence the engine, first clutch, motor generator MG, second clutch, and driving wheels RR, RL, there is arranged a mechanical oil pump between the above-mentioned motor generator MG and the above-mentioned second clutch CL2. When the required hydraulic pressure which tightens the above-mentioned second clutch is reduced, because there can be provided an oil pump driving control means (controller) which drives the above-mentioned mechanical oil pump O/P by the above-mentioned engine or the above-mentioned motor generator MG, it is possible, with only one mechanical oil pump O/P, to perform hydraulic supply at any time. This provides an advantage from the point of view of the number of parts, the cost, and the weight. For example, the hydraulic pressure is reduced with a reduction in speed, and even when it is not possible to maintain tightening of the second clutch which is the departure clutch, hydraulic supply is possible with only one mechanical oil pump O/P.

(2) The oil pump driving control means, while the vehicle is running, generates the necessary hydraulic pressure by driving the mechanical oil pump, which is positioned in front of the second clutch CL2 with respect to the engine E or the motor generator MG. While the vehicle is stopped, if the engine E is operating, there is driving of the mechanical oil pump by the engine E. This vehicle operation condition is referred to as an engine operating condition which is a vehicle stop condition. Because there is driving of the mechanical oil pump by the motor generator MG during idling stop wherein the engine E is stopped, for any state of the vehicle which includes idling stop, it is possible to operate the clutch-brake within the automatic transmission by the generation of hydraulic pressure from one mechanical oil pump. For example, when it becomes necessary to stop at a signal while driving, there is maintenance when engine braking of hydraulic pressure by the same method used for conventional vehicles. At the time of motor regenerative deceleration, there is generated a hydraulic pressure in the same way as with normal AT vehicles until the vehicle's speed can maintain the required hydraulic pressure. The vehicle's speed falls with a reduction also in hydraulic pressure. By generating the necessary hydraulic pressure by driving the mechanical oil pump O/P from the motor generator MG, an auxiliary pump, auxiliary motor, a hydraulic circuit for the motor, a chain and gear are not necessary. As a result, there is simplification of the hydraulic circuit, and there can be seen a reduction in the number of parts (including a reduction in a special electric power source if there is a strong electric driving pump), light weight and a reduction in cost.

(3) When the above-mentioned oil pump driving control means generates a driving force that is suitable for engine idling by combining with the driving of the mechanical oil pump O/P so as to obtain the necessary hydraulic pressure by the above-mentioned motor generator MG, while idling stopped, because there is maintenance of the creep force by controlling the slip tightening of the above-mentioned second clutch CL2, by generating a driving force suitable for normal engine idling, there is creep running by the motor generator MG. At this time, from the creep force which is maintained by creep control of the second clutch, it is possible to have creep running without the unpleasant feelings that may occur with conventional vehicles.

(4) The generation of heat and abrasion of the second clutch CL2 is reduced because the oil pump driving control means, during vehicle stopping, when the brake pedal is depressed, and with a reduction or release of the tightening of the second clutch CL2, retightens the second clutch CL2 by detecting a reduction in brake depression.

(5) Because the oil pump driving control means starts the engine E by the motor generator MG which drives the mechanical oil pump O/P, which is necessary to rapidly depart while the motor is idling during vehicle stoppage, it is possible to quickly start the engine by using the inertia of the motor generator MG to what is required to rapidly accelerate. In this way, by utilizing the motor's inertia when rapidly accelerating, due to the possibility of quickly starting the engine E for a quick departure from a state of complete stoppage that also includes the motor generator, it is expected that it is possible to maintain a departure interval that is close to conventional vehicles or suitably short.

Figure 4:
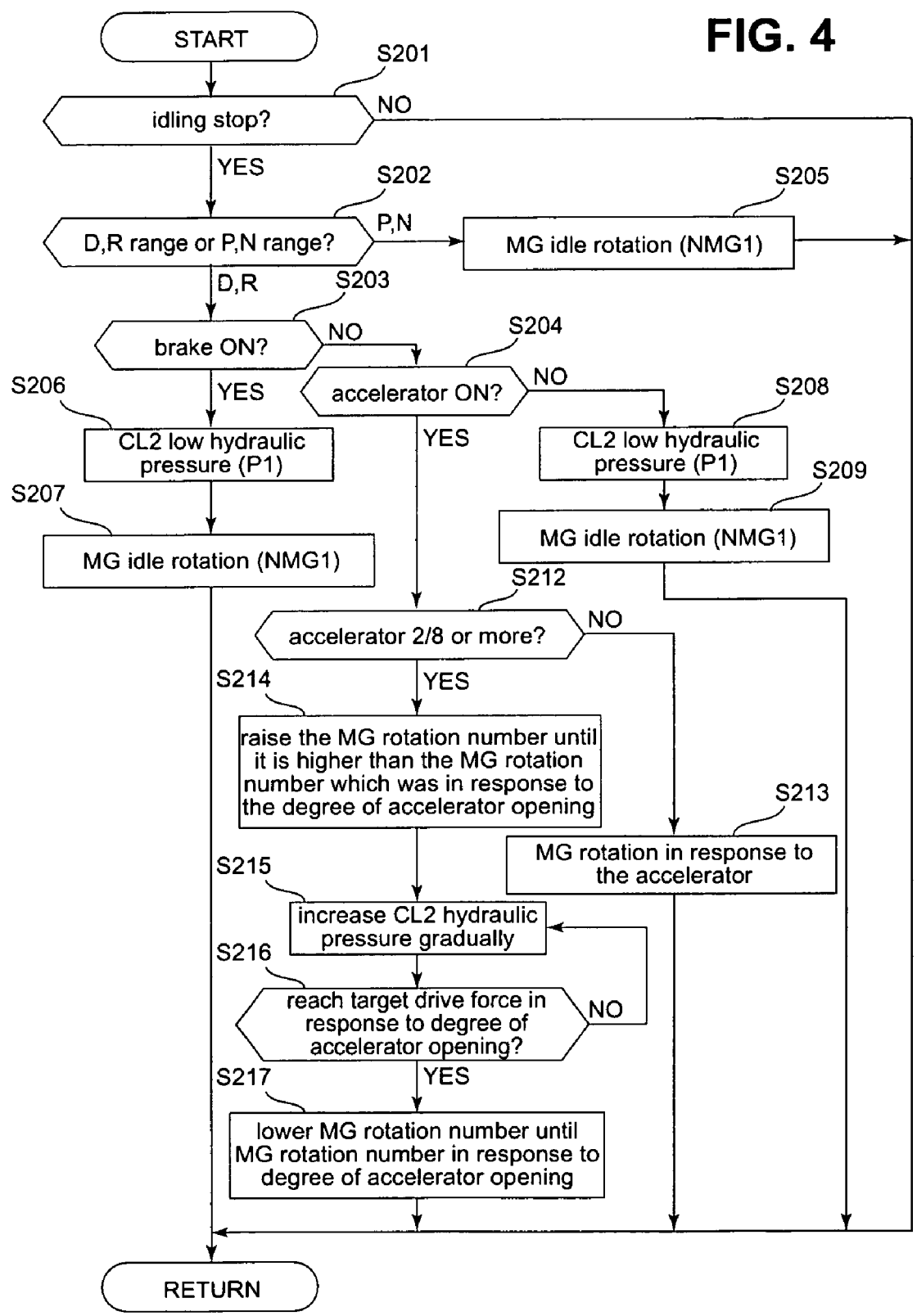
FIG. 4 is a flowchart which shows the flow of an example oil pump driving control processing which is executed by an integration controller of Embodiment 2.

Embodiment 2. Embodiment 2 is an example wherein the rotations of the motor generator are keep at a high level, when departing by the motor's generator, by slipping the second clutch. Because the system formation is the same as that of FIG. 1, drawing and explanation are omitted. FIG. 4 is a flowchart which shows the flow of an example oil pump driving control processing which is executed by an integration controller of Embodiment 2. Moreover, the explanation is omitted for the processing of every step of steps S201~S209 because they are the same as the processing of every step from steps S101~S109 of the flowchart which is shown in FIG. 2.

In step S212 is a continuation by the decision of accelerator ON by the step S204, and there is a determination if the degree of accelerator opening is more than ⅜ (a threshold value for considering that the accelerator pedal depression is large), and if YES, proceed to step S214, and if No, proceed to step S213. In step S213 is a continuation by the decision that the degree of accelerator opening is less than 2/8 by step S212, and assuming that the rotation number that is suitable to the degree of accelerator opening is the rotation number of the motor generator MG, return.

In step S214 is a continuation by the decision the degree of accelerator opening is more than 2/8 by step S212, and there is an increase in the rotation number of the motor generator until it is a high rotation number compared to the motor generation rotation number (=target MG rotation number), which corresponds to the degree of accelerator opening. Then, proceed to step S215. In step S215 there continues to be an increase until a high rotation number is reached compared to the target MG rotation number of the motor generator rotation number in step S214, and ramp control of the clutch hydraulic pressure of the second clutch (control which raises the hydraulic pressure gradually at a fixed gradient) occurs. Then, return to step S216.

In step S216 there continues ramp control of the second clutch pressure in step S215 and a determination of whether or not a target driving force has been reached that corresponds to the degree of opening of the accelerator. If Yes, proceed to step S217, and if No, proceed to step S215. In step S217 there is a continuation of the judgment that the target driving force has been reached that corresponds to the degree of accelerator opening of step S216, a reduction in the motor generator's rotation number until there is reached a motor generator's rotation number corresponding to the degree of accelerator opening (=target MG rotation), and return. Moreover, in parallel with motor generator's rotation number control, tightening control is executed for the second clutch CL2 to ramp control the second clutch until the second clutch CL2 is assumed to be tightened.

Next, there is an explanation of the operation. This explanation of the oil pump driving control operation for Embodiment 2 is based on the flowchart which is shown in FIG. 4. First, when there is idling stoppage, and when the P, N ranges have been selected, in the flowchart of FIG. 4, there is a progression step S201→step S202→step S205, and in step S205, the rotation number of the motor generator MG is assumed to be the idle rotation number NMG1.

While idling stopped, if there is a change in selection from the P. N range to the D, R range, as in the flowchart of FIG. 4, there is a progression S201→step S202→step S203→step S206→step S207, and in step S206, there is slipped tightening control executed assuming that the hydraulic pressure P1 which is used for slip control is supplied to the second clutch CL2, and in step S207, the rotation number of the motor generator MG is assumed to be the idle rotation number NMG1. Furthermore, assuming the brake is OFF, and up to the accelerator is ON, there is a progression S201→step S202→step S203→step S204→step S208→step S209, and in step S208, the slip tightening control is executed as is with the assumption that the hydraulic pressure P1 is used for the second clutch CL2, and in step S209, the rotation number of the motor generator MG and the idle rotation number NMG1 is maintained.

While the vehicle is in an engine idle stop condition, when the D, R range is selected, and the brake is OFF, and the accelerator is ON, until the degree of accelerator opening is 2/8 or more, in the flowchart of FIG. 4, there is the progression step S201→step S202→step S203→step S204→step S212→step S213, and in step S213, the rotation number of the motor generator MG is assumed to be the rotation number which corresponds to the accelerator degree of opening. Furthermore, when the accelerator degree of opening is 2/8 or more, from step S212, there is the progression of step S214→step S215 and until the target driving force which corresponds to the accelerator degree of opening in step S216 is achieved, step S215→step S216 is repeated, and in step S215, the tightening pressure for the second clutch CL2 is raised gradually by the ramp control.

Once it is determined, in step S216, that the target driving force which corresponds to the accelerator degree of opening has been reached, there is a progression from step S216→step S217, and in step S217, there is a reduction in the rotation number of the motor generator until the count reaches the rotation number which corresponds to the accelerator degree of opening, and the ramp control of the tightening pressure for the second clutch CL2 continues until a hydraulic pressure results for which a tightening state exists with no slip.

Figure 5:
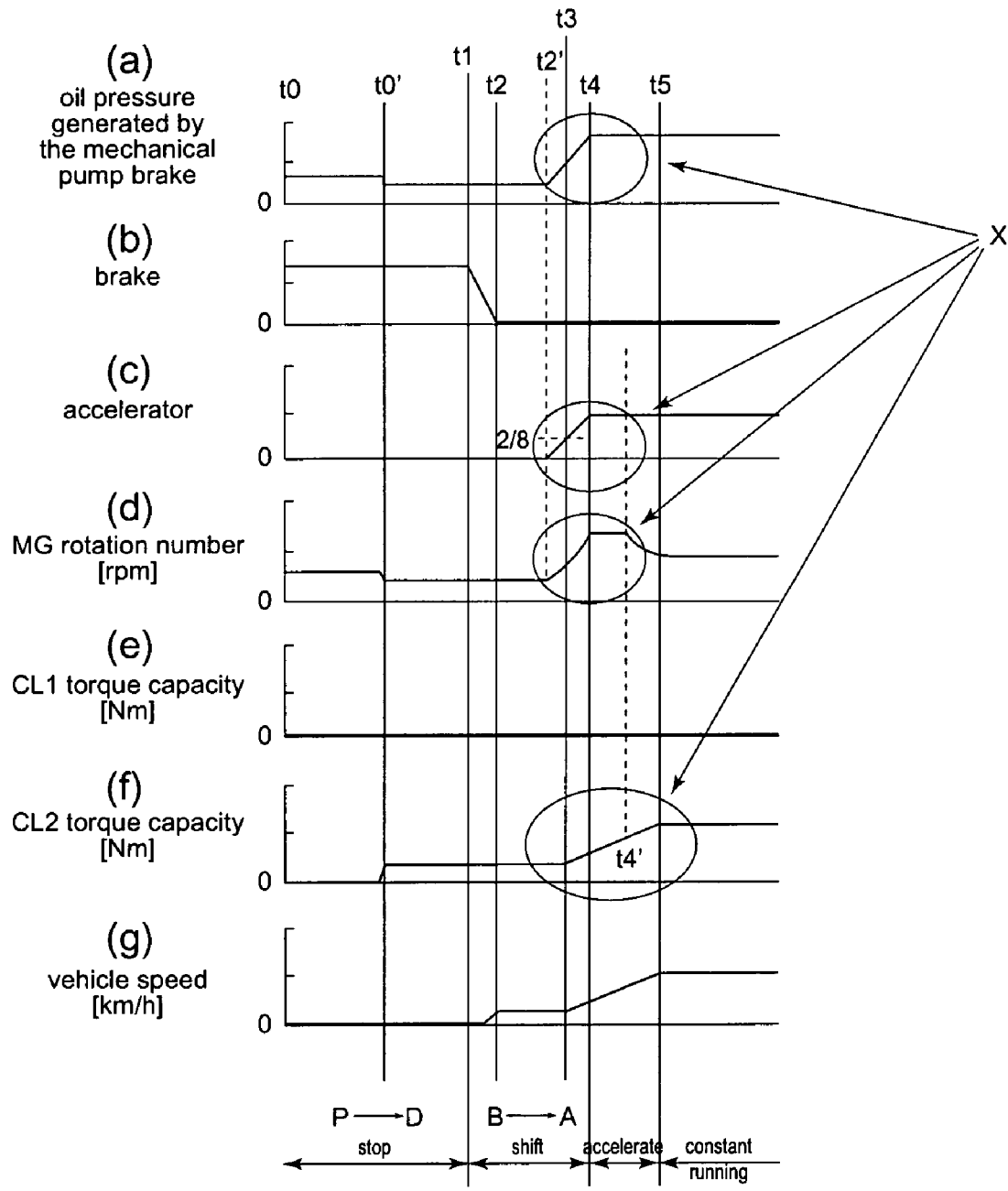
FIG. 5 is a timing chart which shows example properties of the mechanical oil pump in the device of Embodiment 2 during the sequence vehicle stopped→departure→constant speed running.

Next, there is an explanation of the oil pumping driving control utilization in Embodiment 2 based on the time charts which shows the hydraulic pressure generation conditions for every running scene of FIG. 5. FIG. 5 is a timing chart which shows example properties of the mechanical oil pump in the device of Embodiment 2 during the sequence vehicle stopped→departure→constant running. There is displayed (a) the generated hydraulic pressure of the mechanical oil pump O/P, (b) the brake pedal depression amount, (c) the accelerator pedal depression amount, (d) the rotation number of the motor generator MG, (e) the torque capacity of the first clutch, (f) the torque capacity of the second clutch, and (g) the speed of this vehicle.

First, warm-up the engine. From the idle stop time t0 to the time t1, and also while the vehicle is stopped, the motor generator MG maintains an appropriate rotation for an idling stop condition. Accordingly, using the generated hydraulic pressure from the mechanical oil pump O/P, it is possible to maintain operating hydraulic pressure for the clutch-brake, which includes the second clutch within the automatic transmission AT.

At the time t0' between the points t0 and t1, when there has been shifting from the P range to the D range, there is assumed to be possible slip tightening by the slip control for the second clutch, and the accelerator is maintained until the pedal depression initial time t2'. Accordingly, brake release starts at t1, and the brake release is completed by t2, and the vehicle is running from just before t2, and creep speed is maintained until the initial time t2' of accelerator pedal depression.

From t2' until t3 the degree of accelerator opening has become more than 2/8, and with the slip control as is for the second clutch, the rotation number of the motor generator is only raised to correspond to the degree of accelerator opening. By increasing the amount of accelerator depression from t3, at which the degree of accelerator opening has become more than 2/8, until t4, the driver has the intention of leaving. As shown in X of FIG. 5, on the clutch control side, there is ramp control that gradually increases the amount of torque for the second clutch CL2 from t3 until t5, which has resulted in a state of clutch tightening. On the motor generator rotation number control side, until t4', at which time there has been achieved a target driving force corresponding to the degree of accelerator opening, there is performing control that increases the rotation number of the motor generator MG compared to the target MG rotation number, and when t4' is elapsed, there is a gradual reduction until the motor generator rotation number corresponds to the degree of accelerator opening.

In this way, by performing control of increasing the motor generator MG rotation number for the second clutch CL2 by the target MG rotation number, as shown by the generation hydraulic pressure properties of the mechanical oil pump O/P from t3 to t4, it is possible to maintain quickly the necessary hydraulic pressure. In addition, by ramp control which gradually increases the torque for the second clutch CL2 from t3 to t5, because the driving force is transmitted to the left and right rear wheels RR and RL when necessary to correspond to the torque capacity of the second clutch CL2, and regardless of the level of departure acceleration, it is possible to maintain the necessary hydraulic pressure. Moreover, because other functions are equivalent to the Embodiment 1, explanations are omitted.

Next, there is an explanation of the effects. With the oil pump driving control device of the hybrid vehicle of Embodiment 2, in addition to the effects of the Embodiment 1, it may be possible to obtain the following effects. (6) Because the oil pump driving control means maintains the motor generator MG at a high level of rotation by slipping the above-mentioned second clutch, along with being capable of maintaining quickly a sufficient hydraulic pressure, it is possible to maintain a sufficient hydraulic pressure regardless of the extent of the departure acceleration.

Embodiment 3. Embodiment 3, when the hydraulic pressure is reduced by deceleration or stopping, is an example of the operation of the mechanical oil pump by detection of the pump generated hydraulic pressure. The system structure is the same as that of Embodiment 1, so the drawings and explanation are omitted.

Figure 6:
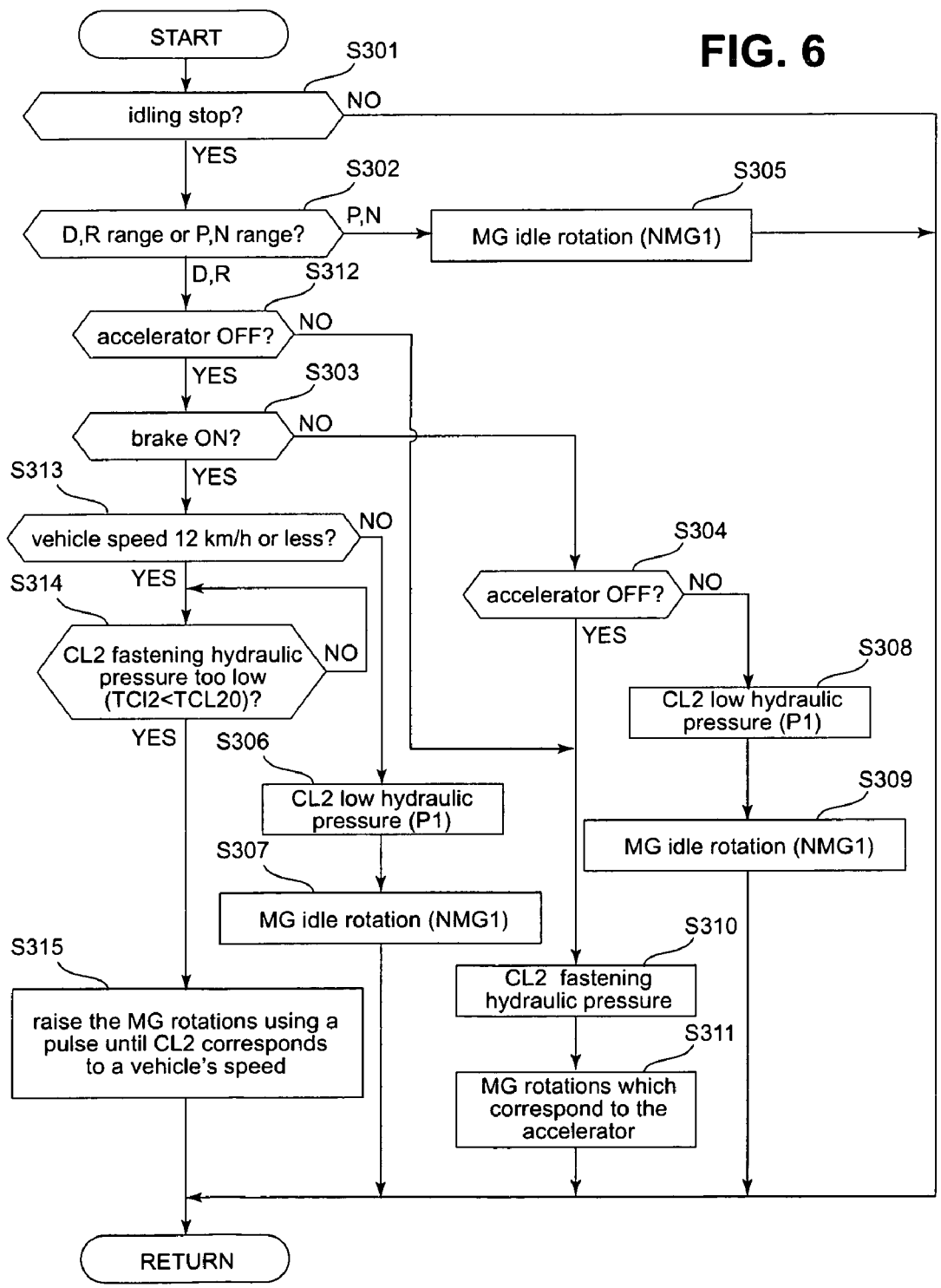
FIG. 6 is a flowchart which shows the flow of an example oil pump driving control processing which is executed by an integration controller of Embodiment 3.

FIG. 6 is a flowchart which shows the flow of an example oil pump driving control processing which is executed by an integration controller of Embodiment 3. The processing of every step from step S301~step S311 is the same as the processing of every step from step S101~step S111, so that the explanation is omitted. In step S312, continuing the determination where R, D were selected by the step S302, there is determination whether or not the accelerator foot is detached, and if YES, proceed to step S303, and if NO, proceed to step S310.

In the step S313, continuing the determination that the brake is ON in step S303, there is a determination whether or not the vehicle's speed is less than or equal to an established speed (for example, 12 km/h) that expresses the vehicle is in the vicinity of a stopped vehicle. If YES, proceed to step S314, and if NO, proceed to step S306.

Step S314 continues from the decision that the vehicle speed in step S313 was 12 km/hr or less, and in this step there is the determination whether or not the clutch tightening hydraulic pressure of the second clutch CL2 is too low, and if YES, proceed to step S315, if NO, continue to repeat the decision in step S314. Moreover, the decision whether or not the clutch tightening hydraulic pressure is too low is a judgment whether or not the clutch tightening hydraulic pressure TCL2 is less than a threshold clutch tightening hydraulic pressure TCL20. Step 315 continues from the decision in step S314 that the clutch tightening hydraulic pressure was too low, and the motor generator rotation number is raised by a pulse (twice) to a rotation number that can be for an appropriate slip for which the second clutch CL2 corresponds to the speed, and then return.

Next, there is an explanation of the use. There is an explanation of the oil pump driving control operation in Embodiment 3 based on the flowchart shown in FIG. 6. First, considering stopping while reducing the speed in a running state, then running with the accelerator depressed, there is the progression step S301→step S302→step S312→step S310→step S311. In step S310, control is exerted, which tightens with no slip of the second clutch CL2, and in step S311, the rotation number of the motor generator MG is assumed to be the rotation that corresponds the degree of opening of the accelerator.

As illustrated in the flowchart of FIG. 6, when performing the accelerator foot detachment operation, until the brake pedal depression operation starts there is the progression S301→step S302→step S312→step S303→step S304→step S308→step S309. In step S308, slip tightening control of the second clutch CL2 is begun, and in step S309, control which reduces the rotation number of the motor generator MG is begun. Next, when beginning the brake pedal depression operation, until the speed is 12 km/h or less, in the flowchart of FIG. 6, there is a progression S301→step S302→step S312→step S303→step S313→step S306→step S307. In step S306, there is a continuation of the slip control with the target hydraulic pressure as the hydraulic pressure P1 which is used for slip control of the second clutch CL2, and in step S307, there is a reduction of the rotation number of the motor generator MG with the target value being the idle rotation number NMG1.

Next, when the vehicle speed is 12 km/h or less, there is a progression in the flowchart of FIG. 6 of step S301→step S302→step S312→step S303→step S313 →step S314. In step S314, when it is judged that the second clutch's hydraulic pressure is too low, proceed to step S315 and exert control that raises the rotation number of the motor generator by pulses (twice) up to revolution speed such that the second clutch can slip appropriately in response to the vehicle speed.

Figure 7:
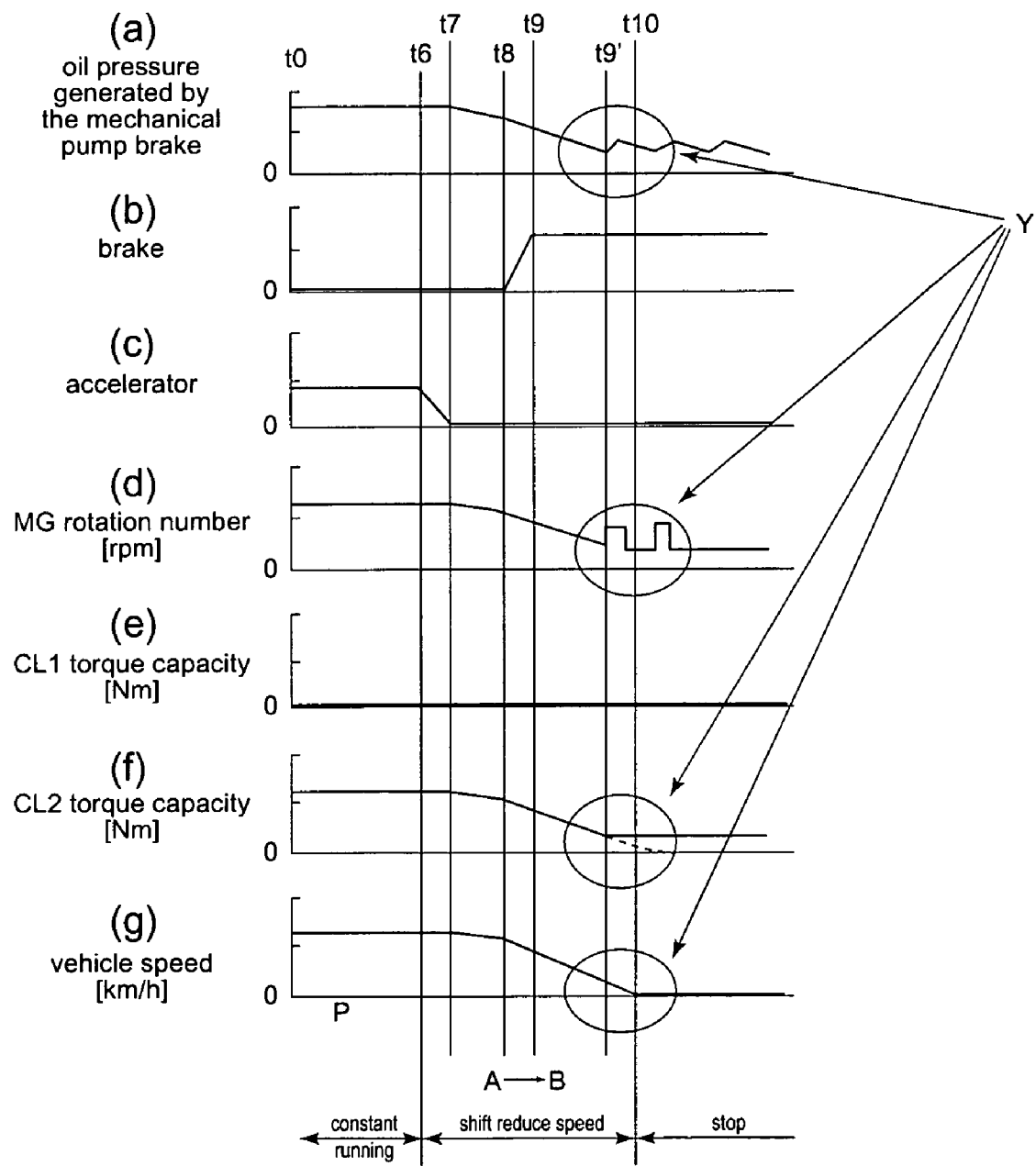
FIG. 7 is a timing chart that shows example properties of the oil pump driving control in the device of Embodiment 3 during the sequence running→reduced speed→stop.

Next, there is an explanation of the oil pump driving control operation in Embodiment 3 based on the timing chart which shows the hydraulic pressure generated state of every running scene of FIG. 7. FIG. 7 is a timing chart that shows example properties of the oil pump driving control in the device of Embodiment 3 during the sequence: running→reduced speed→stop. There is displayed (a) the generated hydraulic pressure of the mechanical oil pump O/P, (b) the brake pedal depression, (c) the accelerator pedal depression, (d) the rotation number of the motor generator MG, (e) the torque capacity of the first clutch, (f) the torque capacity of the second clutch, and (g) the speed of this vehicle.

First, there started the accelerator foot detachment operation from t6, and the accelerator is completely closed at t7. The brake operation is started from t8, and from t9, the brake pedal depression is fixed. By this accelerator operation and brake operation, a constant speed running is maintained until t7, and from t7, there is a slow reduction in speed, and from t8 there is a rapid reduction in speed and at t10, the vehicle is stopped.

At t9', which is between t9 and t10, the vehicle's speed is reduced to that just before stopping (creep speed level), and as shown in FIG. 7, there is detection of the reduction of the generated hydraulic pressure of the mechanical oil pump O/P by a reduction in the tightening hydraulic pressure of the second clutch. The rotation number of the motor generator MG is raised by pulses (twice) up to the rotation number that reflects an appropriate slip for the second clutch corresponding to the speed. For example, when the generated hydraulic pressure of the mechanical oil pump O/P is reduced, and there is no control over increasing the rotation number of the motor generator MG, as shown in the dotted line of Y of FIG. 7, the torque capacity of the second clutch CL2 is reduced such that it is not possible to maintain slip torque capacity for the generation of creep power.

In this way, with a reduction in vehicle speed to 12 km/h or less, each time there is detection that there is a reduction in the tightening hydraulic pressure of the second clutch CL2, by raising the rotation number of the motor generator MG by pulses (twice), the operating time of the motor generator MG and the consumed electric power can be brought to a minimum. Furthermore, when repeating the driving-stop of the motor generator MG by pulses, because of prevention of a hunting in the operation and stoppage of the mechanical oil pump O/P, there is maintained a hysteresis for the hydraulic pressure threshold value which operates and stops the mechanical oil pump O/P. Moreover, other functions are the same as Embodiment 1 and Embodiment 2 and their explanations are omitted.

Next, there is an explanation of the effects. The oil pump driving control device for a hybrid vehicle of Embodiment 3 can obtain the effects listed below by adding to the effects of Embodiment 1 and Embodiment 2. (7) Because the oil pump driving control means operates the mechanical oil pump O/P, when the hydraulic pressure is reduced by slowing down or stopping, the operating time of the mechanical oil pump O/P, while maintaining the hydraulic pressure at a necessary minimum, is also minimized. Thus, it is possible to counter the abrasion or the generation of the second clutch CL2, which is the departure clutch. In addition, with the operating time of the motor generator MG that operates the mechanical oil pump O/P at a minimum, the device is advantageous from the point of view of electrical power consumption.

(8) The above-mentioned oil pump driving control device can prevent a hunting for operation and stopping of the mechanical oil pump O/P, in the case where mechanical oil pump O/P is operated by detecting hydraulic pressure of above-mentioned pump. This is due to the maintained hysteresis for the hydraulic pressure which determines the operation and stopping of the pump.

Embodiment 4. Embodiment 4 is an example at which there is control of the mechanical oil pump's operation stop in by a timer using a detection signal of the running condition of the vehicle as a trigger. The detection signal is provided by a detection means (detector) that detects a running condition of the vehicle. Because the system structure is the same as FIG. 1 of Embodiment 1, the drawings and explanation are omitted.

Figure 8:
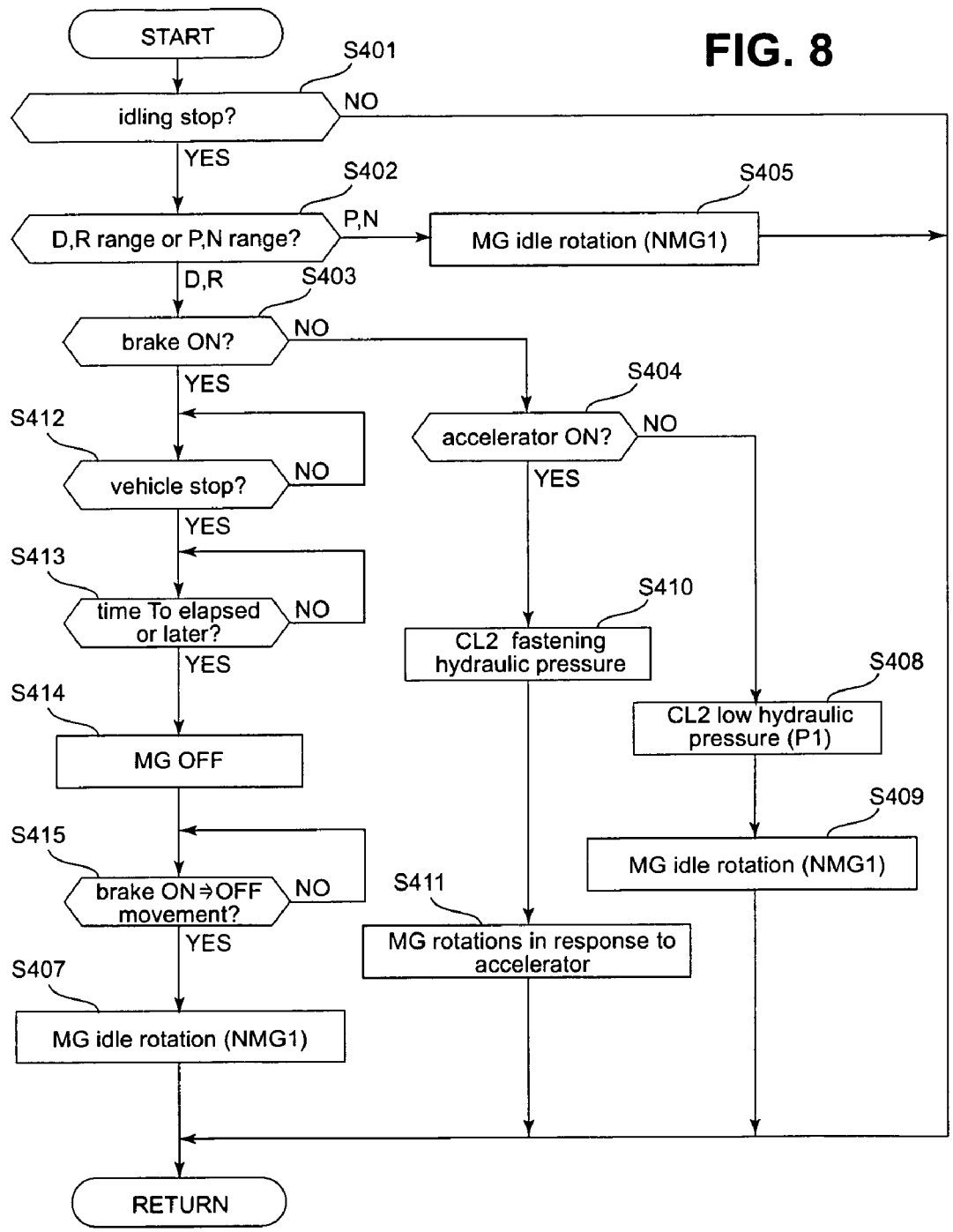
FIG. 8 is a flowchart which shows the flow of an example oil pump driving control processing which is executed by an integration controller of Embodiment 4.

FIG. 8 is a flowchart which shows the flow of an example oil pump driving control processing which is executed by an integration controller of Embodiment 4. Moreover the processing of every step from step S410~step 405 and step S407~step S411 has its explanation omitted because its processing is the same as that, shown in FIG. 2, of step S101~step S105 and step S107~step S111. In step S412, which continues based on the judgment of brake ON of step S403, there is a decision whether or not the vehicle is stopped, and if YES, proceed to step S413, and if NO, repeat the decision of step S412.

In step S413, which continues based on the judgment of the vehicle is stopped in step S412, there is a decision whether or not the vehicle stopping has exceeded a fixed period To. If YES, proceed to step S414, and if NO, repeat the decision of step S413. In step S414, which continues the judgment that the vehicle stopping period has exceeded the fixed period To, the motor generator MG is assumed to be OFF and proceed to step S415. In step S415, which continues the judgment that the motor generator MG is OFF in step S414, there is a decision whether or not a change has occurred from brake ON to brake OFF. If YES, proceed to step S407, and if NO, repeat the decision of step S415.

Next, there's an explanation of the operation. There is an explanation of the oil pump driving control operation for Embodiment 4 based on the flowchart shown in FIG. 8. First, when the vehicle stops while reducing speed from a running condition, when running with the accelerator pedal depressed, in the flowchart of FIG. 8, there is the progression step S401→step S402→step S403→step S404→step S410→step S411. In step S410, with no slip in the second clutch CL2, there is tightening control, and in step S411, the rotation number of the motor generator MG is to be a rotation number that corresponds to the degree of opening of the accelerator.

While performing the operation in which the accelerator separates, until the brake pedal depression operation starts, there is the progression, in the flowchart of FIG. 8, of step S401→step S402→step S403→step S404→step S408→step S409. In step S408, slip tightening control of the second clutch CL2 is begun, and in step S409, control is started for making the idle rotation number the rotation number of the motor generator MG.

Next, there is begun a brake pedal depression operation. When the vehicle stops, in the flowchart of FIG. 8 there is the progression of step S401→step S402→step S403→step S412→step S413. In step S413, there's the determination of whether or not if the period of the vehicle stopping has been more than the fixed period To. If that period has been more than To, proceed from step S413 to step S414, where the motor generator MG is stopped.

Afterwards, with a loosening operation for the brake, in the flowchart of FIG. 8 there is the progression of step S415→step S407. In step S407, there is a restarting of the motor generator MG, which had stopped, and there is an increase in the rotation number of the motor generator until the idle rotation number is reached.

Figure 9:
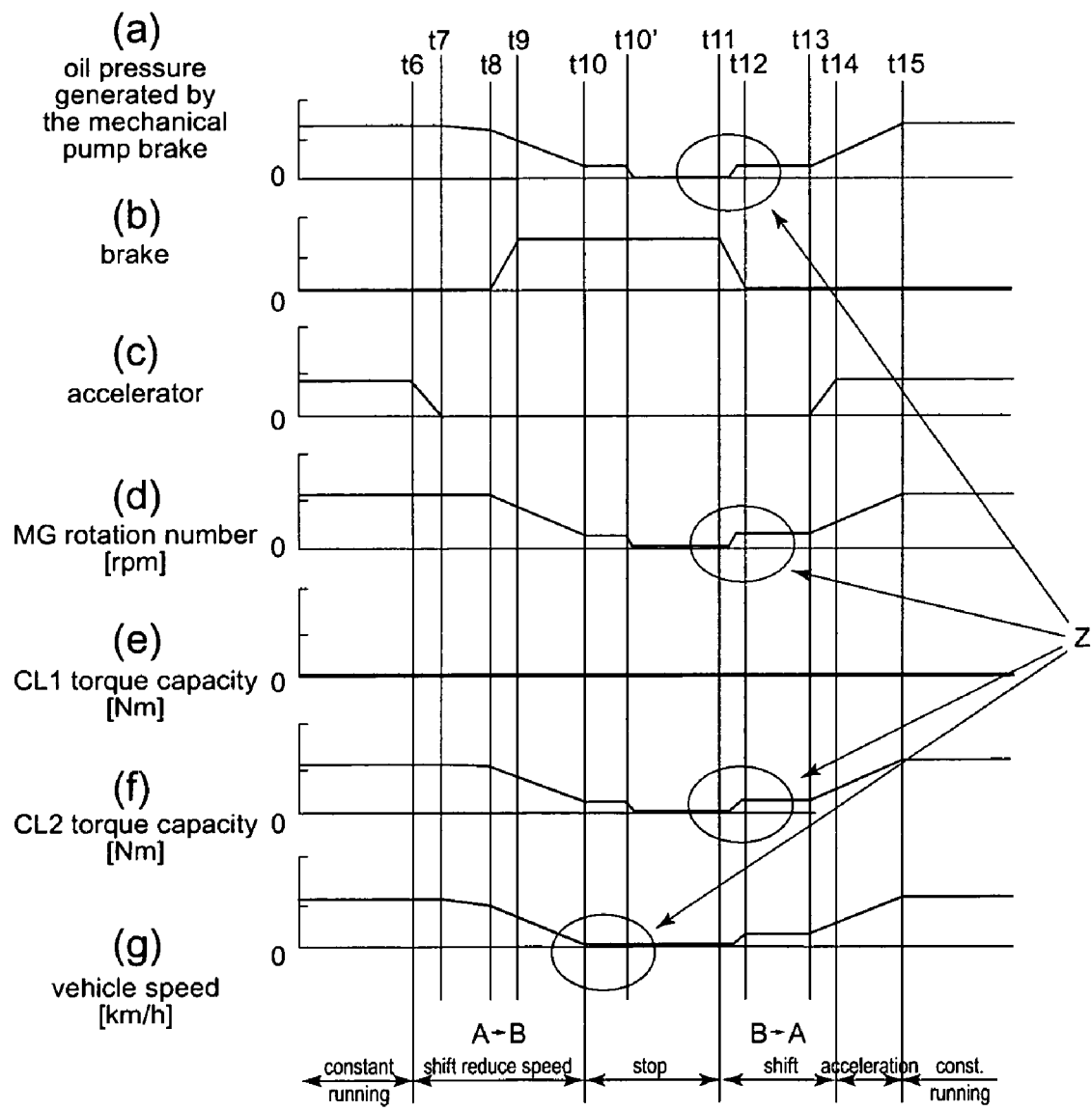
FIG. 9 is a timing chart which shows example operation of the oil pump driving control operation for the device of Embodiment 4 during the sequence constant running→pedal depression reduction→stoppage→pedal depression acceleration→constant speed running.

Next, there's an explanation of the oil pump driving control operation for Embodiment 4 based on the timing chart which shows the hydraulic generation conditions for every running scene of FIG. 9. FIG. 9 is a timing chart which shows example operation of the oil pump driving control operation for the device of Embodiment 4 during the sequence constant speed running→pedal depression reduction→stoppage→pedal depression acceleration→constant speed running. There is shown (a) the generated hydraulic pressure of the mechanical oil pump O/P, (b) the brake depression, (c) the accelerated depression, (d) the rotation number of the motor generator MG, (e) the torque capacity of the first clutch, (f) the torque capacity of the second clutch, and (g) the speed of this vehicle.

First, there is begun an accelerator operation for the accelerator from t6 of FIG. 9, and at t7 the accelerator is completely closed. From t8 there is begun the brake operation, and from t9 to t11 it is assumed that the brake pedal depression is fixed. By this accelerator operation and brake operation, there is maintained a constant speed running until t7, and from t7 there is a gradual reduction in speed, and from t8 there is a rapid reduction in speed so that by t10 the vehicle is completely stopped.

After the vehicle is stopped at t10, until t10' (fixed period To by the timer), if there is continued vehicle stoppage by continuing the brake pedal depression, the rotation of the motor generator MG is stopped. Moreover after the vehicle has stopped, if there is separation from the brake within the fixed period To according to the above-mentioned timer, there is continued rotation of the motor generator MG.

While the rotation of the motor generator MG is stopped, and if there is a reduction in the brake pedal depression at t11 when the vehicle departs, there is an increase in the rotation number of the motor generator MG until the idle rotation number is reached by detection of this brake depression reduction operation (brake ON→OFF operation). Creep is provided by generating a creep appropriate hydraulic pressure for the second clutch CL2 by the mechanical oil pump O/P.

According to the above, in Embodiment 4, because there is a reduction also in the operating time for the mechanical oil pump O/P while maintaining the hydraulic pressure at the necessary minimum, it is possible to prevent abrasion or heat generation of the second clutch. In addition, by making the operating time of the motor generator MG which drives the mechanical oil pump O/P a minimum, from the point of view of power consumption, this device is advantageous. Moreover, as the other functions are equivalent to Embodiments 1, 2, and 3, their explanations are omitted.

Next, there is an explanation of the effects. There can be obtained the following effects for the oil pump driving control device of a hybrid vehicle for Embodiment 4 by adding to the effects of Embodiment 1, 2, and 3. (9) There is established a running condition detection means which detects the running condition of the vehicle, and because the above-mentioned oil pump driving control means controls the operation-stopping of the mechanical oil pump O/P by a timer with a detection signal for the running condition acting as a trigger, it is possible to counter abrasion and heat generation of the second clutch CL2. In addition, by having the driving period of the motor generator MG which drives the mechanical oil pump O/P at a minimum, this device is also advantageous with regard to power consumption.

From the above, there was an explanation of an oil pump driving control device for a hybrid vehicle of this invention based on Embodiment 1~Embodiment 4, and the specific structure is not limited to these embodiments, and there is no limitation to the invention which is related to each claim in the scope of this patent application, and changes and additions of the design are allowed.

Figure 10:
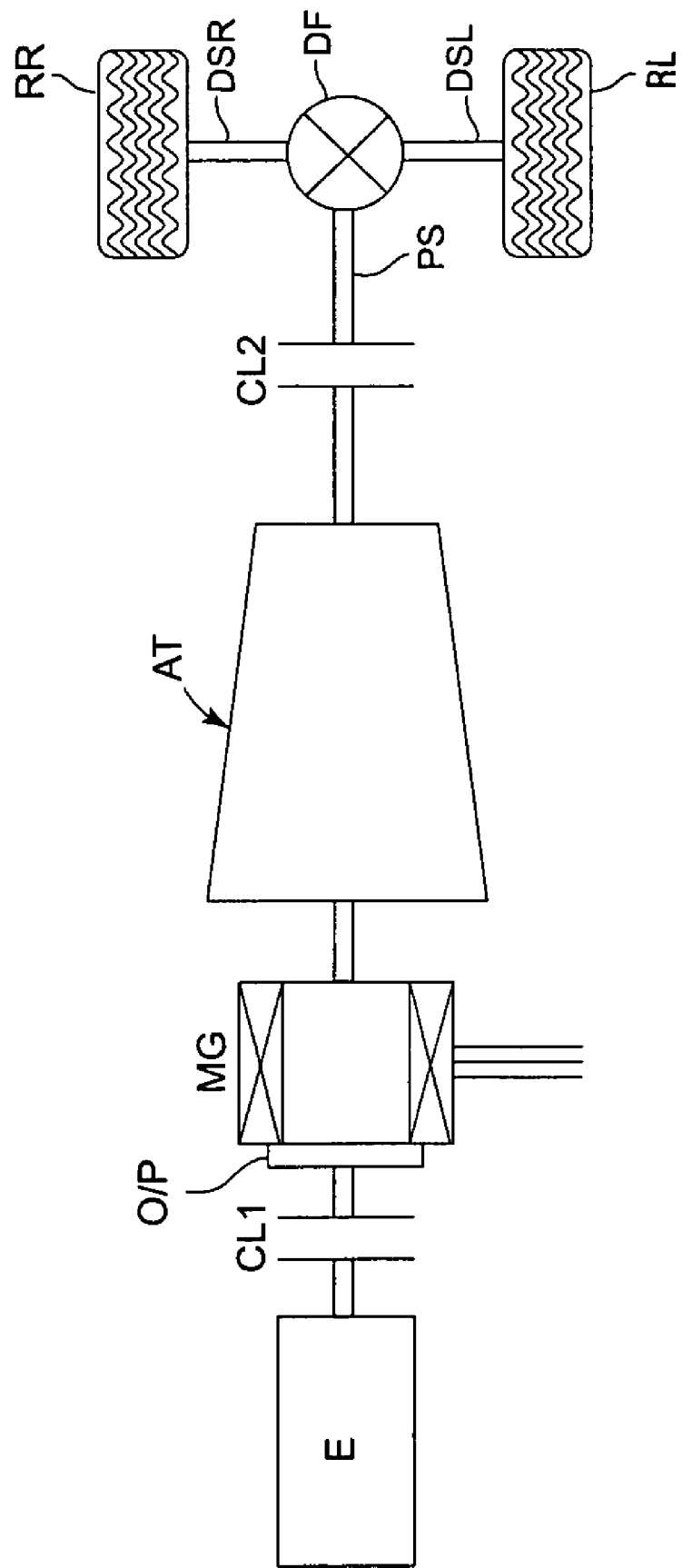
FIG. 10 is a summary view which shows one example of a drive system of a hybrid vehicle which has arranged the oil pump and second clutch at different positions for the Embodiments 1-4.

FIG. 10 is a summary view which shows one example of a drive system of a hybrid vehicle which has arranged the oil pump and second clutch at different positions for the Embodiments 1-4. In Embodiments 1~4, as shown in FIG. 1, there are shown examples in which the mechanical oil pump O/P is arranged between the motor generator MG and the second clutch CL2. However, as shown in FIG. 10, it is permissible to arrange the mechanical oil pump O/P between the first clutch CL1 and motor generator MG, and as necessary, to include in this invention the arrangement of the mechanical oil pump O/P between the first clutch CL1 and the second clutch CL2.

In Embodiments 1~4, as shown in FIG. 1, there is shown an example which reassigns a clutch which is used for the automatic transmission AT as a second clutch CL2, but as is shown in FIG. 10, it is permissible to establish a new second clutch, separately, on the torque transmission path such as the propeller shaft PS between the automatic transmission AT and the drive wheel. As necessary, it is permissible for the second clutch to be established at any position on the power transmission path between the motor generator MG and the drive wheel.

In Embodiments 1~4, as the oil pump driving control means, while the vehicle is running, there is generation of the necessary hydraulic pressure by driving the mechanical oil pump, which is in front of the second clutch, by the engine or motor generator, and while the vehicle is stopped, there is driving of the mechanical oil pump by the engine if the engine is operating, and by the motor generator if in an idle state with the engine stopped. There is shown an example that maintains the creep force by generation of a driving force appropriate for engine idling with motor generator and by slip tightening control of the second clutch when the necessary hydraulic pressure which tightens the second clutch is reduced. If there is a driving means of the mechanical oil pump by the engine or motor generator, it is used as the invention is not limited to these embodiments.

In Embodiment 2, there is shown an example that gradually increases the torque capacity of the second clutch from the start of the accelerator pedal depression operation. After the start of the accelerator pedal depression operation, and after the rotation of the motor generator has been elevated further in response by releasing the second clutch at only a specified time, it is permissible as an example to gradually increase the torque capacity of the second clutch.

In Embodiment 3, when there is a reduction in the pump generated hydraulic pressure by slowing down or stopping, because the tightening hydraulic pressure is reduced for the second clutch CL2, which is the departure clutch, there is shown an example that operates the mechanical oil pump by detection of a tightening hydraulic pressure reduction. The second clutch CL2 cannot maintain the tightening pressure because of the automatic slippage, and it is permissible to operate the mechanical oil pump by detecting the slippage. In addition, when the pump generated hydraulic pressure is reduced by slowing down or stopping, it is permissible to operate the mechanical oil pump by direct detection of the pump generated hydraulic pressure.

In Embodiment 4, there is shown an example which controls the operation and stopping of the mechanical oil pump O/P by a timer with a vehicle speed signal acting as a trigger. Among the vehicle signals, brake operation signals, and accelerator release signals, it is permissible to control the operation and stopping of the mechanical oil pump O/P with other signals which show the running state of the vehicle which act as triggers or a single signal or a plurality of combination of signals which act as triggers for the operation and stopping of the vehicle.

Applicable Industrial Uses. In Embodiments 1~4, there are shown appropriate examples of a hybrid vehicle with rear wheel drive, but it is possible that these embodiments are appropriate for hybrid vehicles for front wheel drive or four wheel drive. As necessary, this invention can be appropriate used for all vehicles if the hybrid vehicle is formed from a first clutch, motor generator, a second clutch, and drive wheel all connected in sequence.

Various embodiments of the invention have been described. These and other embodiments are within the scope of the following claims.

The invention claimed is:

1. A hybrid vehicle comprising:
a drive-train configured and arranged to transmit power in the order of an engine, a first clutch, a motor generator, a second clutch and a drive wheel;
an oil pump operably configured and arranged at a location between the first clutch and the second clutch such that the oil pump is mechanically driven by at least one of the engine and the motor generator; and
a controller configured and arranged to control the oil pump by controlling at least one of the engine and the motor generator in response to a vehicle operation condition of the hybrid vehicle, wherein the engine drives the oil pump when the vehicle operation condition is in an engine operating condition with a vehicle stop condition, and the motor generator drives the oil pump when the vehicle operation condition is in an engine idle stop condition, to obtain a desired oil pressure from the oil pump.

2. The hybrid vehicle as recited in claim 1, wherein
the drive-train further includes an automatic transmission, and the oil pump is configured and arranged at a location between the motor generator and the second clutch to supply an oil pressure to the automatic transmission.

3. The hybrid vehicle as recited in claim 1, wherein
at least one of the engine and the motor generator drive the oil pump when the vehicle operation condition is in a vehicle running condition.

4. The hybrid vehicle as recited in claim 1, wherein
the motor generator drives the oil pump to obtain a desired oil pressure from the oil pump when the vehicle operation condition is in an engine idle stop condition, and the motor generator starts the engine when an acceleration of the hybrid vehicle is requested from the engine idle stop condition.

5. The hybrid vehicle as recited in claim 1, further comprising:
an oil pressure sensor to detect an oil pressure supplied from the oil pump,
wherein at least one of the engine and the motor generator is requested to drive the oil pump when the oil pressure becomes lower than a predetermined pressure.

6. The hybrid vehicle as recited in claim 5, wherein
at least one of the engine and the motor generator is controlled with threshold limits to provide a hysteresis corresponding to the predetermined pressure.

7. The hybrid vehicle as recited in claim 1, wherein
the oil pump is controlled in response to a timer that is triggered by the vehicle operation condition of the hybrid vehicle.

8. The hybrid vehicle as recited in claim 1, wherein
the oil pump is arranged at a location between the motor generator and the first clutch.

9. The hybrid vehicle of claim 1, wherein the controller is configured and arranged to control the second clutch so that a creep torque is not exceeded at the drive wheel during the vehicle stop condition.

10. A hybrid vehicle, comprising:
a drive train configured and arranged to transmit power in the order of an engine, a first clutch, a motor generator, a second clutch, and a drive wheel;
an oil pump operably configured and arranged at a location between the first clutch and the second clutch such that the oil pump is mechanically driven by at least one of the engine and the motor generator; and
a controller configured and arranged to control the oil pump by at least one of the engine, the motor generator and the second clutch in response to a vehicle operation condition of the hybrid vehicle,
wherein the motor generator drives the oil pump with the second clutch controlled in a slip engagement such that a creep torque is applied to the drive wheel when the hybrid vehicle is in an engine idle stop condition.

11. The hybrid vehicle as recited in claim 10, wherein
a torque capacity of the second clutch is controlled to decrease when a brake pedal of the hybrid vehicle is depressed.

12. The hybrid vehicle as recited in claim 10, wherein
a torque capacity of the second clutch is controlled to increase when a depression stroke of the brake pedal is decreased.

13. A hybrid vehicle, comprising:
a drive train configured and arranged to transmit power in the order of an engine, a first clutch, a motor generator, a second clutch, and a drive wheel;
an oil pump operably configured and arranged at a location between the first clutch and the second clutch such that the oil pump is mechanically driven by at least one of the engine and the motor generator; and
a controller arranged and configured to control the oil pump by at least one of the engine, the motor generator and the second clutch in response to a vehicle operation condition of the hybrid vehicle,
wherein the motor generator drives the oil pump with an increased speed in which the second clutch is controlled with a slip engagement when the motor generator starts the hybrid vehicle from a stop condition.

14. A hybrid vehicle comprising:
a drive-train configured and arranged to transmit power in the order of an engine, a first clutch, a motor generator, a second clutch and a drive wheel;
an oil pump operably configured and arranged at a location between the first clutch and the second clutch such that the oil pump is mechanically driven by at least one of the engine and the motor generator; and
a controller configured and arranged to control the oil pump to obtain a desired oil pressure from the oil pump by controlling at least one of the engine and the motor generator in response to a vehicle operation condition of the hybrid vehicle,
wherein the motor generator drives the oil pump at a speed that is substantially equal to an engine idling speed with controlling the second clutch at a reduced torque capacity when the engine is in an engine idle stop condition and the hybrid vehicle is in a non-acceleration condition, and the motor generator drives the oil pump at a predetermined speed corresponding to a depression of an acceleration pedal with controlling the second clutch at an increased torque capacity when the acceleration pedal is depressed.

15. A method for maintaining oil pressure for controlling an automatic transmission of a hybrid vehicle, the method comprising:
detecting a vehicle operation condition of the hybrid vehicle, including an engine idle stop condition, the hybrid vehicle including a drive train configured and arranged to transmit power in the order of an engine, a first clutch, a motor generator, a second clutch, and a drive wheel;
driving an oil pump by the motor generator when the vehicle operation condition is in the engine idle stop condition such that a desired oil pressure is obtained from the oil pump that is arranged between the first clutch and the second clutch; and
driving the oil pump by the engine with an engagement of the first clutch when the vehicle operation condition is in an engine operating condition with a vehicle stop condition.

16. A method for maintaining oil pressure for controlling an automatic transmission of a hybrid vehicle, the method comprising:
detecting a vehicle operation condition of the hybrid vehicle, including an engine idle stop condition, the hybrid vehicle including a drive train configured and arranged to transmit power in the order of an engine, a first clutch, a motor generator, a second clutch, and a drive wheel;
driving an oil pump by the motor generator when the vehicle operation condition is in the engine idle stop condition such that a desired oil pressure is obtained from the oil pump that is arranged between the first clutch and the second clutch; and
controlling the second clutch in a slip engagement such that a creep torque is applied to the drive wheel by the motor generator when the hybrid vehicle is in the engine idle stop condition.

17. The method as recited in claim 16, further comprising: decreasing a torque capacity of the second clutch to control the creep torque applied to the drive wheel when a brake pedal of the hybrid vehicle is depressed.

18. The method as recited in claim 16, further comprising: increasing a torque capacity of the second clutch to control the creep torque applied to the drive wheel when a depression stroke of the brake pedal is decreased.

* * * * *